US000001949H

(19) United States

(12) Statutory Invention Registration (10) Reg. No.: US H1949 H

Hansen et al. (43) **Published: *Mar. 6, 2001**

(54) HYDROGENATED ELASTOMER PRIMED POLYOLEFIN FILM

(75) Inventors: David Romme Hansen; Robert Andrew Tait, both of Houston; Lydia Ann Salazar, Katy, all of TX (US)

(73) Assignee: Shell Oil Company, Houston, TX (US)

( * ) Notice: This patent issued on a continued prosecution application filed under 37 CFR 1.53(d), and is subject to the twenty year patent term provisions of 35 U.S.C. 154(a)(2).

(21) Appl. No.: 08/595,094

(22) Filed: Feb. 1, 1996

(51) Int. Cl.[7] ..... C08J 51/00; C08J 5/02; C08J 91/08

(52) U.S. Cl. ..... 524/505; 524/474; 524/490; 524/491

(58) Field of Search ..... 524/474, 505, 524/490, 491

(56) References Cited

U.S. PATENT DOCUMENTS

| | | | | |
|---|---|---|---|---|
| H1022 | * | 2/1992 | Holden et al. | 524/474 |
| Re. 27,145 | | 6/1971 | Jones | 260/880 |
| 3,239,478 | * | 3/1966 | Harlan, Jr. | 260/27 |
| 3,565,247 | * | 2/1971 | Brochman | 206/59 |
| 3,577,398 | | 5/1971 | Pace et al. | 260/85.3 |
| 3,753,936 | * | 8/1973 | Marrs | 524/474 |
| 3,879,248 | * | 4/1975 | Kest | 156/289 |
| 3,917,607 | * | 11/1975 | Crossland et al. | 524/474 |
| 3,932,327 | * | 1/1976 | Naylor et al. | 524/474 |
| 3,984,369 | * | 10/1976 | Harlan, Jr. et al. | 524/474 |
| 4,062,995 | * | 12/1977 | Korpman | 428/134 |
| 4,332,858 | | 6/1982 | Saitoh et al. | 428/412 |
| 4,360,568 | | 11/1982 | Allison, III | 428/411 |
| 4,578,429 | | 3/1986 | Gergen et al. | 525/291 |
| 4,692,357 | | 9/1987 | Mayumi et al. | 427/393.5 |
| 4,820,568 | * | 4/1989 | Harpell et al. | 428/113 |
| 4,833,193 | * | 5/1989 | Sieverding | 524/474 |
| 4,835,200 | | 5/1989 | St. Clair | 524/100 |
| 4,898,784 | | 2/1990 | Sanders et al. | 428/412 |
| 5,021,113 | | 6/1991 | Sanders et al. | 156/334 |
| 5,112,882 | | 5/1992 | Babu et al. | 522/158 |
| 5,149,741 | | 9/1992 | Alper et al. | 525/95 |
| 5,180,766 | | 1/1993 | Hayama et al. | 524/315 |
| 5,194,530 | | 3/1993 | Stevens et al. | 526/82 |
| 5,209,971 | | 5/1993 | Babu et al. | 428/343 |
| 5,229,464 | | 7/1993 | Erickson et al. | 525/314 |
| 5,234,524 | | 8/1993 | Ozu et al. | 156/327 |
| 5,559,165 | * | 9/1996 | Paul | 524/474 |
| 5,591,792 | * | 1/1997 | Hattori et al. | 524/505 |
| 5,633,286 | * | 5/1997 | Chen | 524/474 |
| 5,710,206 | * | 1/1998 | Francis et al. | 524/491 |

OTHER PUBLICATIONS

Crosslinking KRATON® FG1901X Rubber with CYMEL* 303, pp. 16–17, *Technical Bulletin*, SC:1048–88 (Oct. 1990).

Robert A. Tait et al., "A Pragmatic Approach to the Manufacture of Solventborne Adhesives", *Solvents*, SC:2304–95 (Apr. 1995).

* cited by examiner

*Primary Examiner*—Charles T. Jordan
*Assistant Examiner*—Aileen J. Baker
(74) *Attorney, Agent, or Firm*—Donald F. Haas

(57) ABSTRACT

A pressure-sensitive tape is provided having a polyolefin backing, a primer comprising an elastomeric block copolymer which primer is applied from a non-aromatic hydrocarbon solvent, said tape further comprising an adhesive on the thus primed surface. Because the primer is laid down from a solution in a non-aromatic hydrocarbon solvent such as methyl cyclohexane the process utilizes an environmentally-friendly solvent.

10 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HYDROGENATED ELASTOMER PRIMED POLYOLEFIN FILM

BACKGROUND OF THE INVENTION

This invention relates to primed polyolefin films.

Frequently it is desirable to utilize a primer or tie-coat between a film substrate and an adhesive. Historically, solutions of materials such as NEOPRENE rubber and an aromatic solvent such as toluene have been used. However, environmental concerns encourage substitution of non-aromatic solvents. Excellent substitute solvents such as those based on hydrogenated toluene are available, but they do not adequately dissolve NEOPRENE rubber.

SUMMARY OF THE INVENTION

It is an object of this invention to provide a primed polyolefin film substrate;

It is a further object of this invention to provide an improved process for producing a primed polyolefin film substrate;

It is yet a further object of this invention provide a polyolefin pressure-sensitive tape without the use of aromatic solvents; and It is still yet a further object of this invention to provide a polyolefin substrate primed using an environmentally-friendly primer solution.

In accordance with this invention a polyolefin film substrate is primed with a hydrogenated elastomeric block copolymer dissolved in a non-aromatic hydrocarbon solvent.

DETAILED DESCRIPTION OF THE INVENTION

Applicants have found that toxicity problems and environmental problems with NEOPRENE primer solutions for polyolefin film substrates can be avoided and better adhesion obtained by using a non-aromatic hydrocarbon solution of an elastomeric block copolymer which has been hydrogenated.

The elastomeric block copolymers suitable for use herein are known in the art as disclosed for instance in Stevens et al. U.S. Pat. No. 5,194,530 (Mar. 16, 1993) the disclosure of which is hereby incorporated by reference. Suitable polymers for use in this invention have end-blocks made of polymerized monovinyl aromatic compound thus giving a resinous segment and a mid-block made up at least predominantly of polymerized conjugated diene monomer thus giving an elastomeric segment. The polymers can be linear ABA, or radial or mixtures thereof. Some AB diblock polymer can be present but at least 20, preferably at least 60 weight percent of the block copolymer is ABA or radial (or otherwise branched so as to have two or more terminal resinous blocks per molecule) so as to impart strength. Generally, 80–100 weight percent has two or more terminal resinous blocks per molecule.

Suitable monovinyl aromatic compounds are those having 8 to 20 carbon atoms as exemplified by styrene and styrene homologs such as alpha-methylstyrene and para-methylstyrene. Styrene is especially preferred. Suitable conjugated dienes include those having 4 to 8 carbon atoms. Illustrative of such conjugated dienes are 1,3-butadiene (butadiene), 2-methyl-1,3-butadiene (isoprene), 1,3-pentadiene (piperylene), 1,3-octadiene, and 2-methyl-1,3-pentadiene. Preferred conjugated dienes are butadiene and isoprene.

The end-block segments (A) preferably have a molecular weight of at least 5000, preferably 5000 to 18,000, more preferably 7000 to 10,000. Endblocks of 5000 to 15,000 are also highly suitable. The monovinyl substituted aromatic compound component must be present in an amount of at least about 8 weight percent based on the total weight of the polymer. Generally, 13 to 40 weight percent aromatic component, preferably 20 to 40 weight percent aromatic component is utilized. The weight percentages are based on the weight of the total polymer. The molecular weight of the total polymer can vary considerably but generally will be within the range of 40,000 to 300,000, preferably 60,000 to 180,000. By molecular weight as it refers to linear polymers is meant the molecular weight as measured by gel permeation chromatography (GPC), where the GPC system has been appropriately calibrated with known polystyrene standards. For anionically polymerized linear polymers, the polymer is essentially monodispersed and it is both convenient and adequately descriptive to report the "peak" molecular weight of the narrow molecular weight distribution observed. Such methods are well known and described in patents including U.S. Pat. No. 5,229,464, the disclosure of which are hereby incorporated by reference.

Measurement of the true molecular weight of a final coupled star or radial polymer is not as straightforward or as easy to make using GPC. This is because the star-shaped molecules do not separate and elute through the packed GPC columns in the same manner as do linear polymers used for the calibration, and, hence, the time of arrival at a UV or refractive index detector is not a good indicator of the molecular weight. A good analytical method to use for a star polymer is to measure the weight average molecular weight by light scattering techniques. The sample is dissolved in a suitable solvent at a concentration less than 1 gram of sample per 100 milliliters of solvent and filtered using a syringe and porous membrane filters of less than 0.5 microns pore size directly into the light scattering cell. The light scattering measurements are performed as a function of scattering angle and of polymer concentration using standard procedures. The differential refractive index (DRI) of the sample is measured at the same wave length and in the same solvent used for the light scattering. This results in a molecular weight value which approximates weight average molecular weight.

The elastomeric block polymers utilized in this invention are further hydrogenated to such a degree that the unsaturation of the elastomeric block is greatly reduced without significant hydrogenation of the aromatic unsaturation in the "A" block component. Generally, at least 90 percent, preferably at least 98 percent more preferably at least 99 percent, of the unsaturation in the diene center block is hydrogenated and no more than 25 percent, preferably less than 10 percent of the aromatic unsaturation is hydrogenated. Such hydrogenation techniques are known in the art and disclosed, for instance, in Jones Reissue U.S. Pat. No. 27,145 (Jun. 22, 1971) the disclosure of which is hereby incorporated by reference. Thus, for instance, with one of the preferred block copolymers, styrene-butadiene-styrene, the resulting hydrogenated polymer (because of the 1,2-addition) can be viewed as a styrene-ethylene/butene copolymer-styrene. Similarly, another preferred block copolymer, styrene-isoprene-styrene linear block copolymer can be viewed as a styrene-ethylene/propylene copolymer-styrene block polymer.

The thus hydrogenated elastomers can be used as such in this invention but are preferably functionalized by treatment with an unsaturated monomer having one or more functional groups or their derivatives such as carboxylic acid groups and their salts, anhydrides, esters, imide groups, amide groups, and acid chlorides in addition to at least one point of unsaturation.

The preferred monomers to be grafted onto the block copolymers to give the functionalized polymers utilized in this invention are maleic anhydride, maleic acid, fumaric acid, and their derivatives. It is well known in the art that these monomers do not polymerize easily. A further description of functionalizing selectively hydrogenated block copolymers can be found in Gergen et al. U.S. Pat. No. 4,578,429 (Mar. 25, 1986) the disclosure of which is hereby incorporated by reference.

The resulting grafted polymer will usually contain from 0.02 to 20 preferably 0.02 to 5 or 2 to 5, and most preferably 0.2 to 2 weight percent grafted portion based on the weight of the total polymer including the grafted portion.

Thus the primer composition of this invention comprises the hydrogenated elastomeric block copolymer and the solvent. While the compositions can contain other components such as oils, end-block resins and tackifiers found in adhesives compositions they generally consist essentially of the elastomeric block copolymer and the solvent. Generally, no crosslinking agents are used. This, of course, does not exclude the presence of materials such as stabilizers which are used for the normal purpose of stabilization of the elastomer.

The solvent used in this invention is a non-aromatic hydrocarbon. A particularly preferred solvent is one made up predominantly of methylcyclohexane which is preferably obtained by the hydrogenation of toluene. Such solvents can be produced by hydrogenation of the corresponding aromatic component, i.e. benzene to cyclohexane or can be produced by other known chemical means. Also, naturally occurring non-aromatic hydrocarbons in petroleum streams can be separated and purified for use in this invention. The production of the preferred composition which is predominantly hydrogenated toluene, i.e. methylcyclohexane, along with other aliphatic hydrocarbons species, is described in Shell Brochure SC:2304-95. Typically these solvents have a boiling point with the range of 93 to 132° C. (200 to 270° F.).

The polyolefin can be any of the known film-forming olefin polymers such as polypropylene, polyethylene, and ethylene higher alpha-olefin copolymers such as ethylene/butene, ethylene/pentene, ethylene/hexene, and ethylene/octene copolymers.

Preferably, these polymers, when formed into film, are oriented so as to give additional strength due to the molecular alignment of the molecules. Polymer can be oriented by rapidly drawing during the formation at about the temperature that crystallization occurs. Alternatively, the film can be reheated to just below the crystalline melting point and stretched. In a particularly preferred embodiment the film is biaxially oriented, that is stretched in both longitudinal and transverse directions. Orienting on the heating cycle is much easier because there is a broad temperature window during which significant amounts of the crystals have melted but some have not which is a good orientation temperature, whereas on the cooling cycle the material crystallizes so quickly that it goes through the orientation temperature too fast. Biaxial orientation can be effected with blown film simply by cooling, reheating and blowing the film to a larger diameter than the extrusion annulus and, optionally, at the same time pulling the film at a more rapid rate than the rate of extrusion. Flat film is generally oriented by extruding or calendaring after which it is rolled up and then oriented longitudinally by drawing between sets of heated rolls running at different speeds. The first roll heats the film to orientation temperature and the second pulls it at a faster speed to effect longitudinal orientation. Thereafter the film the gripped at the edges by a tethering frame and moved through an oven where it is heated to orientation temperature and stretched transversely. Alternatively, the transverse orientation can be first or both can be done at once which is preferred but more complicated from a mechanical standpoint. Even with biaxial orientation there is generally greater orientation in the longitudinal direction (especially with flat film) and such film is ideally suited for materials such as packaging tape which utilizes the extremely high tensile strength generated in the longitudinal direction. A particularly preferred material is biaxially oriented polypropylene film.

Film thickness can vary depending on the desired application. For tape applications the thickness is generally within the range of 0.000254 to 0.0254 cm (0.1 to 10 mil), preferably 0.00127 to 0.0127 cm (0.5 to 5 mil), more preferably about 0.00254 to 0.00508 cm (1–2 mil). Such films are, of course, commercially available.

The surface treatment, if utilized, can be carried out in a manner known in the art. One commonly used technique is to utilize a corona discharge which oxidizes this surface. Another common technique is to utilize an acid treatment; alternatively flame treatment can be utilized although this is more commonly practiced with thicker work pieces. Nonetheless, these are all well-known commercial techniques which can be utilized if desired.

Since the solvent will be evaporated away, the concentration is not critical but generally solutions of from 1 to 30, preferably 5 to 20, more preferably 5 to 10 weight percent solids are utilized. The reason for relatively dilute solutions is to allow even application of a relatively thin primer coat and the fact that the elastomer tends to thicken the solution too much at higher concentrations. The solutions can be applied utilizing standard equipment for applying thin coatings of liquids on substrates. For high-speed commercial operations a conventional roll-coater or knife-blade coater would generally be used. With a roll-coater, the solution is applied to a roll which contacts the moving polyolefin film substrate and transfers a thin coating of the solution to the surface of the substrate. Knife-blade coating involves spreading out a thin film of coating solution with a flat blade. All of these techniques are well-known in the art. Primer coatings having a thickness to 0.000127 to 0.00254, preferably 0.000127 to 0.00127, more preferably 0.000254 to 0.000501 cm (0.05 to 1, preferably 0.05 to 0.5, more preferably, 0.1 to 0.2 mils) are utilized.

The adhesive can be any known pressure-sensitive adhesive but is preferably a composition comprising an unhydrogenated elastomeric block copolymer and a tackifier. Preferably it also contains oil, a mineral filler and an antioxidant.

The elastomeric block copolymer can be of the same scope as that block copolymer described hereinbefore with regard to the primer except that it is preferably not hydrogenated. This is because the unhydrogenated material is less expensive and provides better tack. Because of the aliphatic unsaturation, it generally requires a stabilizer, however.

The tackifier is preferably one which is compatible with the elastomeric mid-block section and does not go into the aromatic resinous end-block sections to any significant extent. The type of resins which are mid-block compatible are known in the art and are described, for instance, in Allison U.S. Pat. No. 4,360,568 (Nov. 23, 1982), the disclosure of which is hereby incorporated by reference. These types of materials go exclusively, or almost exclusively, into the rubbery mid-block section, not just because it is rubbery but also because it is a non-aromatic component. Hence, these materials are aliphatic compounds which is meant to include both hydrocarbons and materials such as esters. Hence, the tackifier may be a straight-chain hydrocarbon, such as polymerized olefin sold under a tradename such as Wingtack® 95 (Wingtack 95 is prepared by the cationic polymerization of 60% piperylene, 10% isoprene, 5% cyclopentadiene, 15% 2-methyl-2-butene and about 10% dimer, as taught in U.S. Pat. No. 3,577,398) and Super StayTac®. Others include hydrogenated mixed esters of polymerized rosin sold under the tradename Polypale®, hydrogenated glycerol esters of rosin sold under the tradename Foral® 85, hydrogenated pentaerythritol esters of rosin sold under the tradename Pentalyn® H, polydipentene sold under the tradename Zonarez® 7115, and polyterpenes. Other suitable tackifier resins can be produced by hydrogenating an aromatic component so as to remove not only any vinyl or straight chain unsaturation but also to remove most of the aromatic unsaturation. For instance, a particularly preferred material is sold under the tradename Regalrez® by Hercules.

The oil is preferably one which is compatible with the elastomeric mid-block segment of the elastomeric block copolymer and does not tend to go into the aromatic resinous end-block portion to any significant degree. Suitable oils include hydrogenated naphthenics. These contain low levels of aromatic unsaturation. A particularly suitable material is Tufflo® 6056 sold by Witco. It is a hydrogenated naphthenic. Another preferred oil is SF 371 from Shell.

The mineral filler can be any known mineral filler such as calcium carbonate or titanium dioxide pigment (rutile alumina-treated). Other mineral fillers include clays, talcs, silica and zinc oxide. The mineral filler serves to cheapen the formulations. Mineral filler, if present at all, can be present in an amount within the range of 1 to 20 or 1 to 10 weight percent based on the weight of adhesive composition. The adhesive can be applied from a hot melt or a solution of generally 30 to 65 preferably 40 to 50 weight percent in a suitable solvent. The adhesive will generally be applied so as to give a thickness of 0.00127 to 0.127, preferably 0.00178 to 0.00381 cm (0.5 to 5, preferably 0.7 to 1.5 mils).

Generally, the adhesive and optionally the primer will contain a conventional stabilizer or stabilizer system which frequently is simply an antioxidant such as a hindered phenol. Particularly preferred is Irganox® 1010 which is tetrakis-[methylene-3,5-di-t-butyl-4-hydroxyhydrocinnamate)]methane. Suitable stabilizers are shown in Apalper et al. U.S. Pat. No. 5,149,741 (Sep. 22, 1992), and St. Clair U.S. Pat. No. 4,835,200 (May 30, 1989), the disclosures of which are herein incorporated by reference. Depending upon the severity of the conditions encountered in fabricating and use, more volatile materials such as 2,6-di-t-butylphenol may be utilized. Thiosynergists are less preferred because of possible odor problems. Stabilizers are generally present in an amount within the range of 0.01 to 5, preferably 0.5 to 1 weight percent based on the weight of the primer or adhesive composition exclusive of solvent.

The primer and adhesive compositions may further contain conventional ingredients which do not significantly affect the elastomeric or adhesive properties. Such optional ingredients include pigments, fragrances and other ingredients of adhesives.

EXAMPLES

Example 1

7 weight percent solids in two solvents were prepared and cast onto corona treated biaxially oriented polypropylene film and also cast on the reverse side which was untreated polypropylene. The coating was carried out in the machine direction. The formulations are set out hereinbelow in Table 1.

TABLE 1

| Materials | A | B | C | D | E | F | G | H |
|---|---|---|---|---|---|---|---|---|
| G1652[1] | 7 | 7 | 0 | 0 | 0 | 0 | 0 | 0 |
| FG1901[2] | 0 | 0 | 7 | 7 | 0 | 0 | 0 | 0 |
| B52-5[3] | 0 | 0 | 0 | 0 | 7 | 7 | 0 | 0 |
| Bayprene[4] | 0 | 0 | 0 | 0 | 0 | 0 | 3.5 | 3.5 |
| Nipol[5] | 0 | 0 | 0 | 0 | 0 | 0 | 3.5 | 3.5 |
| Toluene[6] | 93 | 0 | 93 | 0 | 93 | 0 | 93 | 0 |
| XPS6847[7] | 0 | 93 | 0 | 93 | 0 | 93 | 0 | 93 |

[1]KRATON ® R G1652 elastomeric ABA block copolymer; 7,200 MW polymerized styrene end-blocks; mid-block hydrogenated 1–2 addition polymerization butadiene; 28 weight % styrene SEBS
[2]KRATON ® G1652 maleated to give about 2 weight percent functional component.
[3]KRATON ® G1652 maleated to give about 5 weight percent functional component.
[4]Neoprene rubber.
[5]Neoprene rubber.
[6]Aromatic solvent.
[7]Developmental non-aromatic hydrocarbon containing predominantly methylcyclohexane and other aliphatic hydrocarbons.

The films were wrapped on glass plates, cleaned with toluene if the primer was toluene based or cleaned with the non-aromatic hydrocarbon solvent if the primer solution was XPS 6847 based. An 0.00762 centimeter (0.003 inch) bird applicator was used coat a film onto the corona-discharge treated biaxially oriented polypropylene films. All films casted with the toluene-based primers rippled and puckered only on the film path, not on the uncoated edges. After about 5 minutes of air drying in the hood the polypropylene films flattened and returned back to flat and smooth. The XPS-naphthenic based primers did not appear to affect most of the polypropylene films. One or two of the films showed slight ripple or puckering. They returned back to original shape after 5 minutes in the hood. After a total of one hour in the hood the films were transported to a vacuum oven for four hours at 40° C. (104° F.) and stored in boxes in standard controlled temperature, controlled humidity conditions for 36 hours.

For this test the adhesive was not applied. The test being directed specifically to the performance of the primer. The primed films were contacted with a commercial 3M 2-inch wide tape using a 4-lb. roller. The tape was rolled on with two complete passes. The films were slit 1.27 cm (0.5 inch) wide, about 2.54 cm (1 inch) of laminate was peeled apart and put in an Instron Pneumatic Grip using a "T" peel configuration. The primer thickness was between 0.000254–0.000501 cm (0.1–0.2 mils). The corona-treated polypropylene film had a thickness of about 0.0027–0.0033 cm (1.1–1.3 mils).

The results are set out hereinbelow in Table 2. Some of the samples were also visually observed and the percent primer failure and an arbitrary adhesive failure scale was utilized for evaluation.

TABLE 2

| I.D. | avg[1] (pli) | solvent | primer | % primer fail[4] |
|---|---|---|---|---|
| A(tsu)[2] | 4.36 | TOL | G1652 | 3 |
| A(tsd)[3] | 4.18 | TOL | G1652 | 30 |
| B(tsu) | 4.34 | XPS | G1652 | |

TABLE 2-continued

| I.D. | avg[1] (pli) | solvent | primer | % primer fail[4] |
|---|---|---|---|---|
| B(tsd) | 4.06 | XPS | G1652 | |
| C(tsu) | 5.12 | TOL | FG1901 | 0 |
| C(tsd) | 5.12 | TOL | FG1901 | 0 |
| D(tsu) | 4.34 | XPS | FG1901 | 1 |
| D(tsd) | 4.12 | XPS | FG1901 | 0 |
| E(tsu) | 4.2 | TOL | B52-5 | 0 |
| E(tsd) | 4.9 | TOL | B52-5 | |
| F(tsu) | 4.7 | XPS | B52-5 | |
| F(tsd) | 5 | XPS | B52-5 | |
| G(tsu) | 2.04 | TOL | NEOPR | 70 |
| G(tsd) | 2.28 | TOL | NEOPR | 38 |
| H[5] | | XP | NEOPR | |

[1]An average of the five "T" peel Instron readings (pli). A high reading indicates good adhesion of the primer to the biaxially-oriented polypropylene backing, and a low number indicates poor adhesion. The actual reading on the ½-inch wide film was multiplied by 2 to give the number reported.
[2]Indicates treated side up, i.e. this tests the adhesion of the primer to the 30 micron corona discharge-treated surface.
[3]Treated side down; this tests the adhesion of the primer to the side of the biaxially oriented polypropylene film not corona discharge treated.
[4]Against polypropylene film
[5]Could not be run since material would not dissolve in non-aromatic solvent.

As can be seen from formulations B, D, and F, the functionalized elastomeric block copolymer and the environmentally-friendly non-aromatic solvent gave excellent results and were uniformly better than the commercial neoprene primer by a factor of about two. Thus, the invention allows the use of an environmentally-friendly solvent with dramatic improvement rather than any sacrifice in quality of the adhesion.

Example 2

In this Example, films were prepared as in Example 1 except when corona treated, the treatment was at two levels, 40 and 50 dynes. Also in this Example, the prime surface was further coated with an adhesive formulation to simulate an actual commercial tape application. The adhesive formulation was as follows:

| | |
|---|---|
| D1107 | 100 parts |
| Wingtack ® 95 | 100 parts |
| IRGANOX ® 1010 | 1 part |

D1107 is KRATON® D1107 which is a unhydrogenated styrene-isoprene-styrene ABA block copolymer having approximately 10,800 molecular weight end-blocks with total molecular weight (polystyrene equivalent molecular weight) of about 230,000 made by coupling with a di-functional coupling agent. The above ingredients were dissolved so as to give a 40% solids concentration in toluene or the non-aromatic hydrocarbon solvent as indicated in the following table. The solutions were casted on top of the primed films prepared as set out in Example 1. Compositions are shown hereinbelow in Table III.

TABLE 3

| Materials | A | B | C | D | E | F | G[8] |
|---|---|---|---|---|---|---|---|
| G1652[1] | 7 | 7 | | | | | |
| FG1901[2] | | | 7 | 7 | | | |

TABLE 3-continued

| Materials | A | B | C | D | E | F | G[8] |
|---|---|---|---|---|---|---|---|
| B52-5[3] | | | | | 7 | | |
| Bayprene[4] | | | | | | 3.5 | |
| Nipol[5] | | | | | | 3.5 | |
| Toluene[6] | 93 | — | 93 | — | 93 | 93 | |
| XPS 6847[7] | — | 93 | — | 93 | — | — | |

[1]KRATON ® R G1652 elastomeric ABA block copolymer; 28% styrene SEBS; mid-block hydrogenated 1–2 addition polymerization butadiene
[2]KRATON ® G1652 maleated to give about 2 weight percent functional component.
[3]KRATON ® G1652 maleated to give about 5 weight percent functional component.
[4]Neoprene rubber.
[5]Neoprene rubber.
[6]Aromatic solvent.
[7]Commercial non-aromatic hydrocarbon containing predominantly methylcyclohexane.
[8]No primer.

After the primers were casted onto corona-treated or untreated sides the films were hood-dried for one hour and then transferred to a vacuum oven with drying continued at 40° C. (104° F.) for four hours. The thickness of the dried primers averaged about 0.00051 cm (0.2 mils). Then the primers were casted with the adhesive formulation at 0.0038 cm (1.5 mils) thick on average and dried under the same conditions as the primers. The films were annealed in the same manner as the Example 1 films for 24 hours at controlled temperature and controlled humidity conditions and tested using an Instron testing machine ("T" peel configuration). Results are shown hereinafter in Table 4.

TABLE 4

"T" Peel Results

| | avg[1] (pli) | solvent | primer |
|---|---|---|---|
| A (treated, 40 dynes) | 3.9 | TOL | G1652 |
| A (treated, 56 dynes) | 2.9 | TOL | G1652 |
| A (not treated) | 4.3 | TOL | G1652 |
| B (treated, 40 dynes) | 4.1 | XPS | G1652 |
| B (treated, 56 dynes) | 3.8 | XPS | G1652 |
| B (not treated) | 5.6 | XPS | G1652 |
| C (treated, 40 dynes) | 5.8 | TOL | FG1901 |
| C (treated, 56 dynes) | 5.4 | TOL | FG1901 |
| C (not treated) | 5.7 | TOL | FG1901 |
| D (treated, 40 dynes) | 5.4 | XPS | FG1901 |
| D (treated, 56 dynes) | 5.7 | XPS | FG1901 |
| D (not treated) | 4.3 | XPS | FG1901 |
| E (treated, 40 dynes) | 5.5 | TOL | B52-5 |
| E (treated, 56 dynes) | 5.8 | TOL | B52-5 |
| E (not treated) | 3.3 | TOL | B52-5 |
| F (treated, 40 dynes) | 3 | TOL | neopr |
| F (treated, 56 dynes) | 3 | TOL | neopr |
| F (not treated) | 2.9 | TOL | neopr |
| G (treated, 40 dynes) | 5.6 | NA | None |

[1]An average of the five "T" peel Instron readings as in Example 1. A high reading indicates good adhesion of the primer to the biaxially-oriented polypropylene backing chemical and a low number indicates poor adhesion.

This Example shows that the apparent advantage for the invention as set out in Example 1 where the primer was simply tested by itself is confirmed in the formulation of an actual tape with the adhesive placed on the primed surface. That is, a non-aromatic solvent can be used for both the primer and the adhesive to give a composition which is not only environmentally friendly in its manufacture but also performs almost twice as well as the control (Run F with the commercial NEOPRENE). While toluene was used for convenience in applying the adhesive, the environmentally friendly solvent used for the primer can be used for the adhesive too.

While this invention has been described in detail for purposes of illustration, it is not construed as limited thereby but is intended to cover all changes and modifications within the spirit and scope thereof.

What is claimed is:

1. A process comprising:

applying a solution consisting of a selectively hydrogenated elastomeric block copolymer having at least two resinous end-blocks of polymerized monovinylaromatic compound and an elastomeric mid-block of a polymerized conjugated diene and a non-aromatic hydrocarbom solvent to a surface of a polyolefin film; and evaporating said solvent to deposit the selectively hydrogenated elastomeric block copolymer as a primer coating on said surface, said primer coating effective as a tie-coat between said polyolefin film and an adhesive.

2. The process according to claim 1 wherein said hydrogenated elastomeric block copolymer is derived from a copolymer selected from the group consisting of linear styrene-butadiene-styrene and linear styrene-isoprene-styrene.

3. The process according to claim 2 wherein said end-blocks have a peak molecular weight within the range of 5,000 to 15,000 and wherein said block copolymer contains 13 to 40 weight percent of said styrene and has a total peak molecular weight within the range of 60,000 to 180,000.

4. The process according to claim 1 wherein said block copolymer has 0.02–5 weight percent, based on the weight of said block copolymer, of a grafted material.

5. The process according to claim 1 wherein said block copolymer has 0.2–2 weight percent, based on the weight of said block copolymer, of grafted maleic anhydride.

6. The process according to claim 1 wherein said film is biaxially oriented polypropylene.

7. The process according to claim 1 said surface of said film has no surface treatment.

8. The process according to claim 1 wherein said non-aromatic hydrocarbon solvent is methyl cyclohexane.

9. The process according to claim 1 wherein said solution has 5–10 weight percent concentration of said copolymer.

10. The process according to claim 9 wherein said hydrogenated elastomeric block copolymer is derived from a linear styrene-butadiene-styrene copolymer wherein said end-blocks have a peak molecular weight within the range of 5,000 to 15,000 and wherein said block copolymer contains 13 to 40 weight percent of said styrene and has a total peak molecular weight of 60,00 to 180,000, and wherein said block copolymer contains 0.2–2 weight percent of grafted maleic anhydride, wherein said film is biaxially oriented polypropylene having no surface treatment and wherein said solvent comprises predominantly methyl cyclohexane.

* * * * *